United States Patent
Sivley, IV et al.

(10) Patent No.: US 8,029,025 B1
(45) Date of Patent: Oct. 4, 2011

(54) SINGLE TAPER WEDGE THREAD CONNECTION WITH MID-SEAL

(75) Inventors: Robert S. Sivley, IV, Kingwood, TX (US); Gary W. Ward, Conroe, TX (US)

(73) Assignee: Hydril Company, Houston, TX (US)

( * ) Notice: Subject to any disclaimer, the term of this patent is extended or adjusted under 35 U.S.C. 154(b) by 1344 days.

(21) Appl. No.: 11/191,420

(22) Filed: Jul. 28, 2005

(51) Int. Cl.
*F16L 15/00* (2006.01)

(52) U.S. Cl. ........................ 285/333
(58) Field of Classification Search ........... 285/333, 285/334, 334.1, 334.2, 334.3, 334.4
See application file for complete search history.

(56) References Cited

U.S. PATENT DOCUMENTS

| | | | |
|---|---|---|---|
| RE30,647 E | | 6/1981 | Blose |
| 4,570,982 A | * | 2/1986 | Blose et al. .............. 285/334 |
| 4,662,659 A | | 5/1987 | Blose |
| 4,703,954 A | | 11/1987 | Ortloff |
| 4,753,460 A | | 6/1988 | Tung |
| 4,796,928 A | | 1/1989 | Carlin et al. |
| 4,838,068 A | | 6/1989 | Carlin et al. |
| RE34,467 E | | 12/1993 | Reeves |
| 5,360,239 A | | 11/1994 | Klementich |
| 5,415,442 A | | 5/1995 | Klementich |
| 5,454,605 A | | 10/1995 | Mott |
| 5,649,725 A | * | 7/1997 | Nagasaku et al. ............ 285/334 |
| 5,826,921 A | | 10/1998 | Woolley |
| 6,123,368 A | | 9/2000 | Enderle |
| 6,206,436 B1 | | 3/2001 | Mallis |
| 6,254,146 B1 | * | 7/2001 | Church ..................... 285/334 |
| 6,409,175 B1 | | 6/2002 | Evans et al. |
| 6,543,816 B1 | * | 4/2003 | Noel ........................ 285/333 |
| 6,578,880 B2 | | 6/2003 | Watts |
| 6,607,220 B2 | | 8/2003 | Sivley, IV |
| 6,626,471 B2 | | 9/2003 | Mallis |
| 6,722,706 B2 | | 4/2004 | Church |

FOREIGN PATENT DOCUMENTS
WO    WO 0129476 A1 * 4/2001

* cited by examiner

*Primary Examiner* — Daniel Stodola
(74) *Attorney, Agent, or Firm* — Osha Liang LLP

(57) ABSTRACT

A tubular connection includes a pin member and box member. The pin member includes a pin thread formed on a small step and a large step and a first seal surface formed between the small step and the large step. The box member includes a box thread formed on a small step and a large step and a second seal surface formed between the small step and the large step. The pin thread and the box thread are wedge threads. The small step and the large step of both the pin member and the box member are formed on a single taper. Upon a selected make-up of the pin member with the box member, a seal is formed between at least a portion of the first seal surface and the second seal surface.

13 Claims, 4 Drawing Sheets

SINGLE TAPER WEDGE THREAD CONNECTION WITH MID-SEAL

BACKGROUND OF INVENTION

Casing joints, liners, and other oilfield tubulars are often used in drilling, completing, and producing a well. Casing joints, for example, may be placed in a wellbore to stabilize a formation and protect a formation against high wellbore pressures (e.g., wellbore pressures that exceed a formation pressure) that could damage the formation. Casing joints are sections of steel pipe, which may be coupled in an end-to-end manner by threaded connections, welded connections, and other connections known in the art. The connections are usually designed so that a seal is formed between an interior of the coupled casing joints and an annular space formed between exterior walls of the casing joints and walls of the wellbore. The seal may be, for example, an elastomer seal (e.g., an o-ring seal), a thread seal, a metal-to-metal seal formed proximate the connection, or similar seals known in the art.

In FIG. 1, a connection having a metal-to-metal seal at an intermediate position is shown. Such a connection is disclosed as an embodiment of U.S. Pat. No. 6,543,816 issued to Noel. That patent is incorporated herein by reference in its entirety. The connection includes a pin member 101 and a box member 102, each with a single tapered thread, 18 and 19 respectively. The pin thread 18 and the box thread 19 are interrupted at an intermediate position to form corresponding seal surfaces, which form a metal-to-metal seal 20 when a sufficient contact pressure exists therebetween. The metal-to-metal seal 20 shown in FIG. 1 is commonly referred to as a "mid-seal" due to its intermediate position, as opposed to other types of metal-to-metal seals located on the end of the pin member or the box member. To ensure that the desired contact pressure exists to form metal-to-metal seal 20, a positive stop is provided by pin nose 23 on the pin member 101 and shoulder 22 on the box member 102.

One type of thread commonly used to form a thread seal is a wedge thread. In FIG. 2, a connection having a wedge thread is shown. "Wedge threads" are characterized by threads, regardless of a particular thread form, that increase in width (i.e., axial distance between load flanks 225 and 226 and stab flanks 232 and 231) in opposite directions on the pin member 101 and box member 102. The rate at which the threads change in width along the connection is defined by a variable commonly known as a "wedge ratio." As used herein, "wedge ratio," although technically not a ratio, refers to the difference between the stab flank lead and the load flank lead, which causes the threads to vary width along the connection. A detailed discussion of wedge ratios is provided in U.S. Pat. No. 6,206,436 issued to Mallis, and assigned to the assignee of the present invention. That patent is incorporated herein by reference in its entirety.

Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference. Continuing with FIG. 2, on the pin member 101, the pin thread crest 222 is narrow towards the distal end of the pin member 101 while the box thread crest 291 is wide. Moving along the axis 105 (from right to left), the pin thread crest 222 widens while the box thread crest 291 narrows. In FIG. 1, the thread surfaces are tapered, meaning that the pin thread 106 increases in diameter from beginning to end while the box thread 107 decreases in diameter in a complimentary manner. Having a thread taper improves the ability to stab the pin member 101 into the box member 102 and distributes stress in the connection.

Generally, thread seals are difficult to achieve with non-wedge threads having broad crests and roots, however, the same thread forms may have thread seals when used for wedge threads. Wedge threads do not have any particular thread form. One example of a suitable thread form is a semi-dovetailed thread form disclosed in U.S. Pat. No. 5,360,239 issued to Klementich, and incorporated herein by reference. Another thread form includes a multi-faceted load flank or stab flank, as disclosed in U.S. Pat. No. 6,722,706 issued to Church, and incorporated herein by reference. Each of the above thread forms is considered to be a "trapped" thread form, meaning that at least a portion of the corresponding load flanks and/or corresponding stab flanks axially overlap. An open (i.e. not trapped) thread form with a generally rectangular shape is disclosed in U.S. Pat. No. 6,578,880 issued to Watts. The above thread forms are examples of thread forms that may be used for embodiments of the invention. Generally, open thread forms such as buttress or stub acme are not suitable for wedge threads because they would impart a large radial force on the box member. A generally square thread form, such as that disclosed by Watts, or a trapped thread form does not impart an outward radial force on the box member. Those having ordinary skill in the art will appreciate that the teachings contained herein are not limited to particular thread forms.

For wedge threads, a thread seal is accomplished by the contact pressure caused by interference over at least a portion of the connection between the pin load flank 226 and the box load flank 225 and between the pin stab flank 232 and the box stab flank 231, which occurs when the connection is made-up. Close proximity or interference between the roots 292 and 221 and crests 222 and 291 completes the thread seal when it occurs over at least a portion of where the flank interference occurs. Generally, higher pressure may be contained with increased interference between the roots and crests ("root/crest interference") on the pin member 101 and the box member 102 and by increasing flank interference. This particular connection also includes a metal-to-metal seal that is accomplished by contact pressure between corresponding seal surfaces 103 and 104, respectively located on the pin member 101 and box member 102.

Wedge threads typically do not have a positive stop torque shoulder on the connection. For wedge threads that do not have a positive stop torque shoulder, the make-up is "indeterminate," and, as a result, the relative position of the pin member and box member varies more during make-up for a given torque range to be applied than for connections having a positive stop torque shoulder. As used herein, "make-up" refers to threading a pin member and a box member together. "Selected make-up" refers to threading the pin member and the box member together within a desired range of torque, or based on a relative position (axial or circumferential) of the pin member with the box member. For wedge threads that are designed to have both flank interference and root/crest interference at a selected make-up, both the flank interference and root/crest interference increase as the connection is made-up (i.e. increase in torque increases flank interference and root/crest interference). For wedge threads that are designed to have root/crest clearance, the clearance decreases as the connection is made-up. Regardless of the design of the wedge thread, corresponding flanks and corresponding roots and crests come closer to each other (i.e. clearance decreases or interference increases) during make-up. Indeterminate make-up allows for the flank interference and root/crest interference to be increased by increasing the make-up torque on the connection. Thus, a wedge thread may be able to thread-seal higher pressures of gas and/or liquid by designing the connection to have more flank interference and/or root/crest interference or by increasing the make-up torque on the connection, however, this also increases stress on the connection during make-up, which could lead to failure during use.

Although wedge threads provide a thread seal in most cases, they are typically unable to seal gases. Most metal-to-metal seals, which are more capable of sealing gases, require relatively thick connections. To seal against both internal and external gas pressure, a connection could have a metal-to-metal seal on the pin nose for internal pressure and a metal-to-metal seal on the box face for external pressure, but this would increase the thickness of the connection. It would be desirable to obtain gas sealing capability against both internal and external pressure with a thin connection.

SUMMARY OF INVENTION

In one aspect, the present invention relates to a tubular connection including a pin member and box member. The pin member includes a pin thread formed on a small step and a large step and a first seal surface formed between the small step and the large step. The box member includes a box thread formed on a small step and a large step and a second seal surface formed between the small step and the large step. The pin thread and the box thread are wedge threads. The small step and the large step of both the pin member and the box member are formed on a single taper. Upon a selected make-up of the pin member with the box member, a seal is formed between at least a portion of the first seal surface and the second seal surface.

In another aspect, the present invention relates to a method of designing a tubular connection. The method includes selecting a pin member and a box member, each having a small step and a large step with wedge threads formed thereon. A first seal surface is selected to form between the small step and the large step of the pin member. The method further includes selecting a second seal surface to form between the small step and the large step of the box member, wherein the first seal surface and the second seal surface are configured to form a seal at a selected contact pressure and wherein at least one of the first seal surface and the second seal surface is frustoconical. A wedge ratio and an angle for the seal surface that is frustoconical are selected such that galling does not occur between the first seal surface and the second seal surface within a selected torque range.

Other aspects and advantages of the invention will be apparent from the following description and the appended claims.

DETAILED DESCRIPTION

In one aspect, the present invention provides connections having metal-to-metal seals. More specifically, embodiments of the present invention have wedge threads formed on a single taper with a mid-seal formed thereon.

Figure 1:
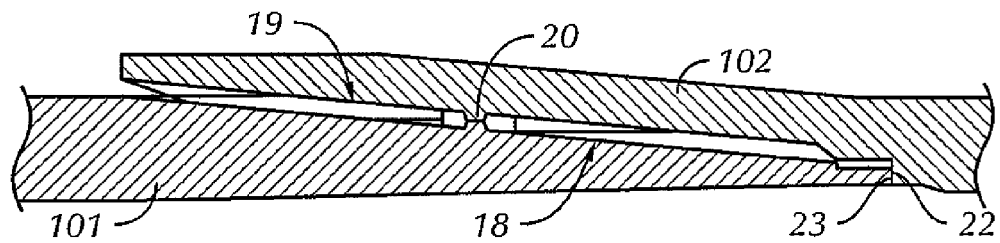
FIG. 1 shows a prior art connection having a mid-seal.
Figure 3A:
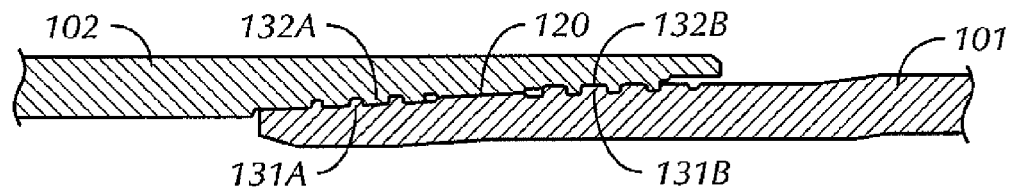
FIG. 3A shows a connection having an expandable mid-seal in accordance with an embodiment of the present invention.
Figure 8:
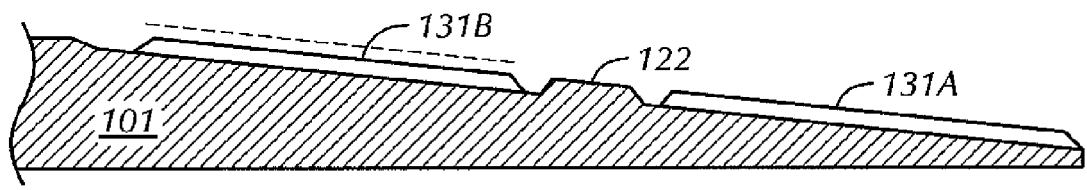
FIG. 8 shows a pin member in accordance with an embodiment of the present invention.
Figure 2:
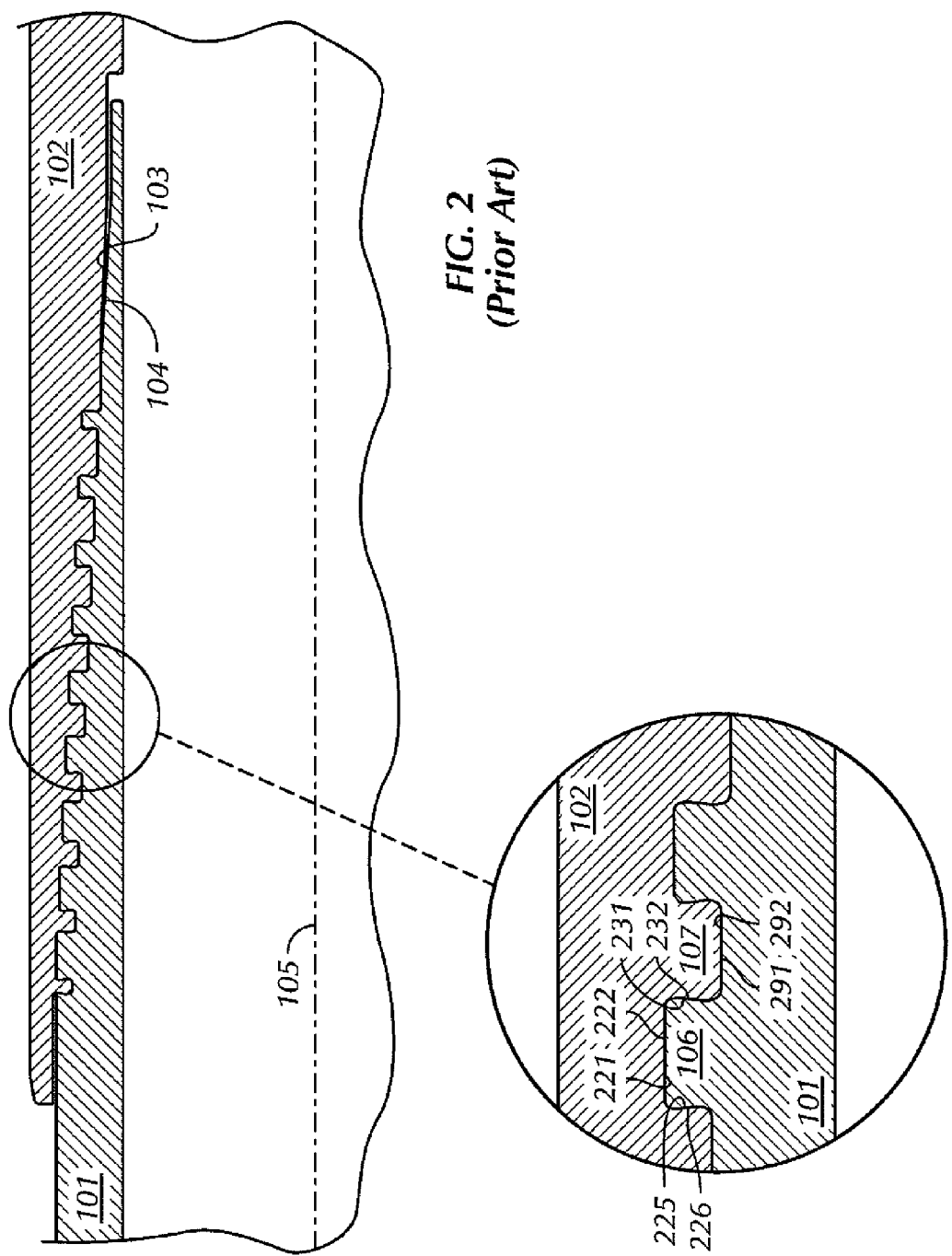
FIG. 2 shows a prior art connection having a wedge thread.

In FIG. 3A, a connection in accordance with an embodiment of the present invention is shown. The connection includes a pin member 101 and a box member 102. The pin member includes two threaded portions 131A and 131B, which make-up to threaded portions 132A and 132B, respectively, on the box member 102. The threaded portions are wedge threads, which allow for the connection to not have a positive stop torque shoulder to make-up the pin member 101 with the box member 102. The threaded portions of the respective members are formed on a single taper (i.e. single step), with an interruption to form a mid-seal 120, which is shown in detail in FIG. 3B. Because of the interruption of the threaded portions, the same terminology for two-step connections is used for the purpose of describing embodiments of the present invention. A "small step" refers to the threaded portion having the smaller diameter and a "large step" refers to the threaded portion having the larger diameter. As used herein, a "single taper" means that the small step and the large step are on the same conical surface (i.e. substantially collinear when viewed as a cross-section). The small step and large step may be slightly offset, less than about the height of a thread (offset range is illustrated by the dashed lines above and below threaded portion 131B in FIG. 8), or vary slightly in taper angle and still be a "single taper" as used to describe the present invention. Those having ordinary skill in the art will appreciate that the taper may be measured at any location on the connection, although the taper is typically measured at the roots of each thread pitch. A single taper is preferable when an overall thinner connection is desired. Although the threaded portions 131A, 132A and 131B, 132B are about equal in length, their length may vary without departing from the scope of the present invention.

Figure 3B:
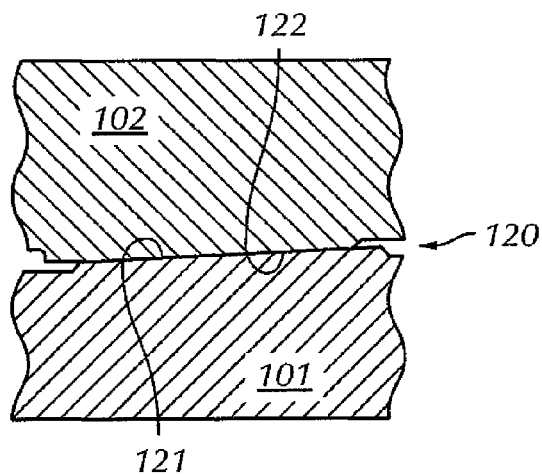
FIG. 3B shows a detailed view of the mid-seal of the connection shown in FIG. 3A.

Turning to FIG. 3B, a detailed view of mid-seal 120 from FIG. 3A is shown in accordance with an embodiment of the present invention. FIG. 3B shows the mid-seal 120 at a selected make-up. At the selected make-up, a selected contact pressure exists between corresponding seal surfaces 121 and 122 on the pin member 101 and the box member 102, respectively. In this particular embodiment, corresponding seal surfaces 121 and 122 are frustoconical with about the same angles relative to the central axis of the connection. In another embodiment, the corresponding seal surfaces 121 and 122 may have different angles. The selected contact pressure between corresponding seal surfaces 121 and 122 provides a mid-seal 120 able to seal pressure across the connection.

To avoid interference between the threaded portions and the seal surfaces, it may be necessary to "clip" one or more of the threads adjacent to the mid-seal area. As used herein, "clipping" a thread means making the thread shorter relative to the rest of the threaded portion of which it is a part. The thread may be initially manufactured to be shorter than the rest of the threaded portions, or the crest of the thread may be partially removed afterwards. Clipping a thread results in a gap between the clipped crest and the corresponding root. In some connections, the angle of the taper will require that one or more threads be clipped to avoid interference with the seal area during make-up of the connection. The threads to clip for the purpose of avoiding interference are the threads on the large step of the box member, which must pass the seal surface on the pin member, and the threads on the small step of the pin member, which must past the seal surface on the box member. A steeper taper angle relative to the thread height increases the amount of thread that must be clipped to avoid interference. In another embodiment, the taper angle may be about 4 to 7 degrees. Those having ordinary skill in the art will appreciate that one or more advantages of the present invention may be obtained regardless of the taper angle.

Figure 4:
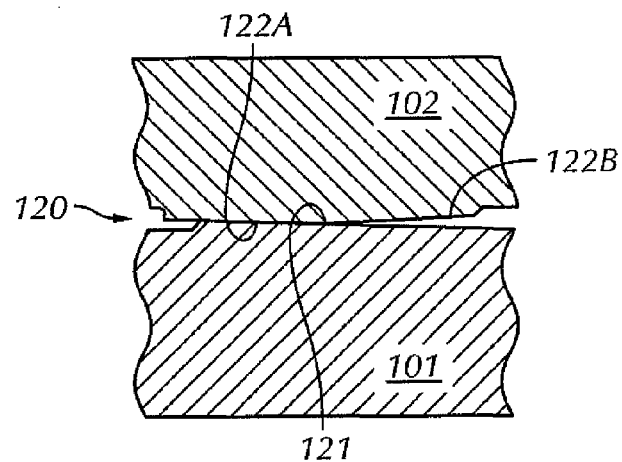
FIG. 4 shows a detailed view of a mid-seal in accordance with an embodiment of the present invention.

Turning to FIG. 4, a mid-seal in accordance with an embodiment of the present invention is shown. The seal surface on the box member 102 includes two surfaces, 122A and 122B. Seal surface 122A may be substantially cylindrical, while seal surface 122B is frustoconical, tapering outward from seal surface 122A. The pin member 101 includes a seal surface 121, which may be cylindrical. The corresponding seal surfaces 121 and 122A are in contact. with a sufficient contact pressure to seal against hydraulic pressure.

Figure 5:
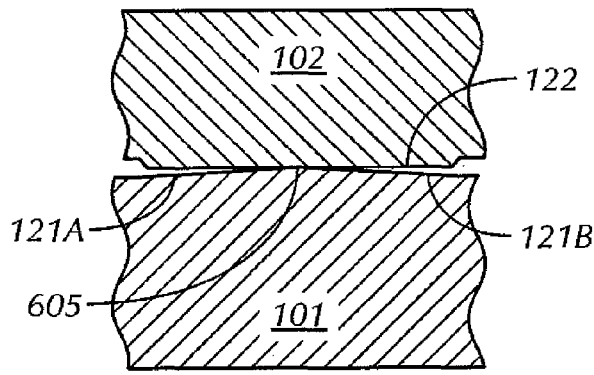
FIG. 5 shows a detailed view of a mid-seal in accordance with an embodiment of the present invention.

In FIG. 5, another mid-seal in accordance with an embodiment of the present invention is shown. The mid-seal in FIG. 5 includes a pin member 101 with two seal surfaces 121A and 121B, which intersect at sealing line 605. The box member 102 has a seal surface 122, which may be frustoconical. In this particular embodiment, the sealing is designed to occur between sealing line 605 and seal surface 122 when the connection is made-up. An advantage of a sealing line 605 is that it provides a narrow circumferential line of contact for the mid-seal. This reduces the contact area, thereby increasing the contact pressure and providing a higher pressure seal. Further, a narrow line of contact is less dependent on surface finish for sealing than relatively large contact surfaces. Those having ordinary skill in the art will appreciate that sealing line 605 may be rounded or chamfered without departing from the scope of the present invention. Further, in some embodiments, the mid-seal 120 may include two or more sealing lines that form a seal against the seal surface 122.

Figure 6:
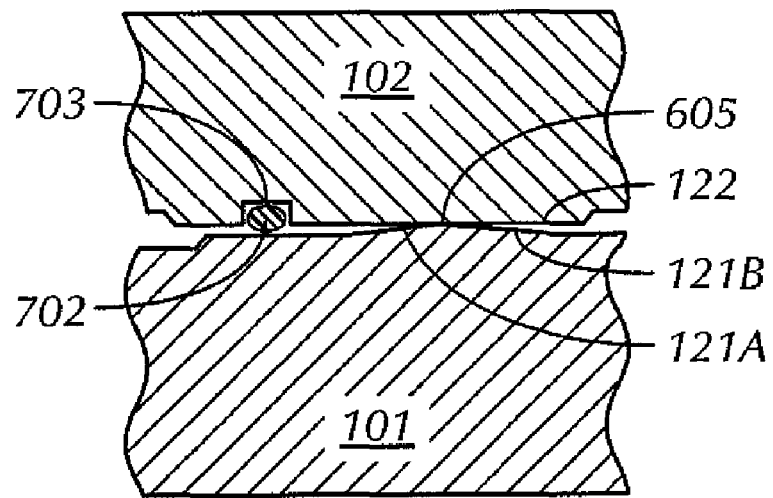
FIG. 6 shows a detailed view of a mid-seal in accordance with an embodiment of the present invention.

Turning to FIG. 6, a detailed view of mid-seal 120 is shown. In this particular embodiment, the mid-seal 120 includes a sealing element 702, such as an O-ring, disposed in a groove 703 formed in the box member 102. In one embodiment, the groove 703 may be formed in the pin member 101. Sealing element 702 is designed to provide a seal for the connection in addition to the mid-seal 120. Any sealing ability provided by the sealing element 702 would be redundant to that provided by mid-seal 120 between contact line 605 and seal surface 122.

Figure 7:
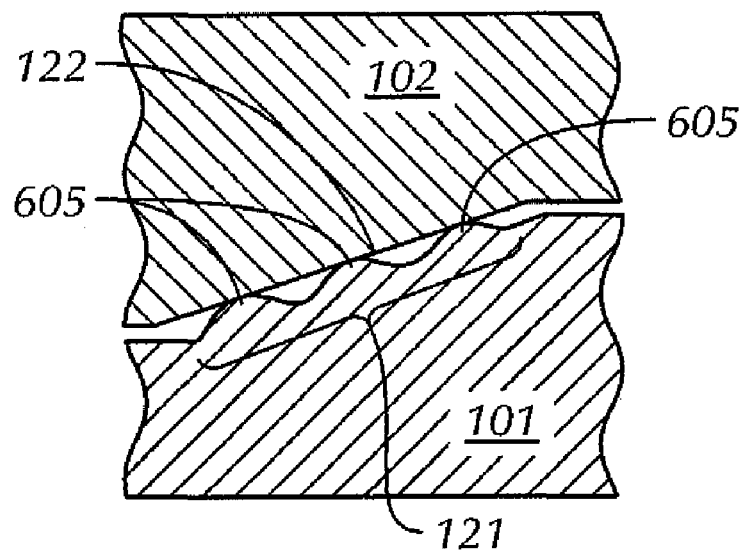
FIG. 7 shows a detailed view of a mid-seal in accordance with an embodiment of the present invention.

FIG. 7 shows a mid-seal in accordance with another embodiment of the present invention. In this embodiment, the seal surface 121 is undulating along a taper. The seal surface 121 may include three sealing lines 605, which provide narrow circumferential lines of contact with seal surface 122, which is frustoconical, on the box member 102 when the connection is made-up. The embodiment shown in FIG. 7 provides a redundant sealing arrangement by forming a seal across as many as three sealing lines 605. This may be advantageous if damage occurs during the handling of the connection on the surface. For example, the connection may successfully seal if only one or two of the sealing lines 605 are undamaged.

In embodiments having one or more frustoconical seal surfaces, a consideration in the selection of an angle for the frustoconical seal surface is the galling of the mid-seal when the connection is made-up. If the angle is selected to be small, the contact pressure between the corresponding seal surfaces will increase gradually during make-up; however, this causes the corresponding seal surfaces to contact for an increased number of turns. In such an embodiment, if the material and lubrication make the connection prone to galling, a shallow angle may cause the corresponding seal surfaces to gall during make-up. Because wedge threads have an indeterminate make-up, the pin member and the box member may continue to turn relative to each other after the corresponding seal surfaces come into contact, which will further increase the risk of galling corresponding seal surfaces having a shallow angle.

Other considerations in the selection of an angle for a frustoconical seal surface are the thickness of the connection and to what extent the corresponding seal surfaces act as a stop shoulder. A steeper angle increases the thickness of the connection, which is often undesirable. Accordingly, the angle may be balanced between galling considerations and the desired thickness of the connection. A shallow angle causes the corresponding seal surfaces to come into contact with gradually increasing contact pressure, which allows continued turning of the pin member relative to the box member. Conversely, a steep angle causes the contact pressure between corresponding seal surfaces to increase rapidly, which can prevent the continued make-up of the connection. As a result, the steep angle will cause the make-up of the connection to be more determinate. This should be considered in the design and manufacture of the connection because the wedge threads may not be properly made-up when the corresponding seal surfaces come into contact.

Another method for limiting galling relates to the selection of a wedge ratio. Increasing a wedge ratio causes the make-up of the wedge thread to be more determinate by causing the corresponding flanks to come into contact more per thread pitch. By making the make-up more determinate, dynamic contact of the corresponding seal surfaces during make-up can be minimized. The wedge ratio cannot simply be increased as desired because a high wedge ratio makes the connection more susceptible to backing off during use. Some level of indeterminate make-up can actually be advantageous because it allows for users of the connection to make-up the connection to any torque within a range of allowable torque.

In one or more embodiments, the wedge ratio and the angle of a frustoconical seal surface may be considered together. As discussed above, both the angle of a frustoconical seal surface and the wedge ratio affect how indeterminate the make-up of the connection will be. In one embodiment, the angle of a frustoconical seal surface may be selected to match the wedge ratio of the wedge threads such that the frustoconical seal surface does not interfere with the make-up of the connection.

In one embodiment, the wedge ratios of the wedge threads on the small step and the large step may be different and/or may vary on the small step and/or the large step. A two-step wedge thread connection is disclosed in U.S. Pat. No. 6,206,436 issued to Mallis and assigned to the assignee of the present invention. That patent is incorporated herein by reference in its entirety. Mallis discloses a two-step wedge thread connection having different wedge ratios, one of which is considered to be an "aggressive" wedge ratio and the other a "conservative" wedge ratio. "Aggressive" refers to the larger wedge ratio, and "conservative" refers to the smaller wedge ratio. Everything else the same, the greater the wedge ratio, the more determinate the make-up. Too large of a wedge ratio may have an inadequate wedging effect, which can allow the connection to back-off during use. Smaller wedge ratios are better able to resist backing-off of the connection. Too small of a wedge ratio may have such an indeterminate make-up that galling may occur over the lengthened make-up distance. Mallis discloses that one of the steps can have a wedge ratio that is optimized for a more determinate make-up (aggressive), while the other step can have a wedge ratio that is optimized for preventing back-off of the connection (conservative).

The variance of a wedge ratio on a single taper is disclosed in U.S. patent application Ser. No. 11/026,512 titled "Pseudo Two-Step Connection," and assigned to the assignee of the present application. That application is incorporated herein by reference in its entirety. In one embodiment, one or both of the large step and the small step of the connection may have a varied wedge ratio. For example, the small step may have a first wedge ratio, a transition wedge ratio, and a second wedge ratio.

In some embodiments, a thread seal may be provided at the selected make-up. In one embodiment, a wedge thread having interference between the roots and the crests of the pin member and the box member may be used to provide a thread seal. A thread seal provides redundant sealing capability for the connection.

Embodiments of the present invention have one or more of the following advantages. Wedge threads are capable of making high strength connections that can achieve the strength of the tubular while not being much thicker than the overall tubular when made-up, in large part due to not requiring a positive-stop torque shoulder. A metal-to-metal seal would typically require a thicker connection; however, the mid-seal of the present invention may be used without increasing the thickness of the connection or significantly degrading the strength of the connection because only a small amount, on the order of two or less thread pitches, may be removed to accommodate the mid-seal. The single mid-seal is able to seal against both internal and external gas and fluid pressure. As a result, internal and external gas sealing may be achieved in a thin, high strength connection.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A tubular connection comprising:
    a pin member comprising,
        a pin thread formed on a small step and a large step, and
        a first seal surface formed between the small step and the large step;
    a box member comprising,
        a box thread formed on a small step and a large step, and
        a second seal surface formed between the small step and the large step;
    wherein the pin thread and the box thread are wedge threads,
    wherein the small step and the large step of both the pin member and the box member are formed on a single taper,
    wherein, upon a selected make-up of the pin member with the box member, a seal is formed between at least a portion of the first seal surface and the second seal surface,
    wherein said selected make-up is indeterminate, and
    wherein a wedge ratio on the wedge threads on the small step of the pin member and the box member are different from a wedge ratio on the wedge threads on the large step of the pin member and the box member.

2. The tubular connection of claim 1, wherein the single taper is less than about 10 degrees.

3. The tubular connection of claim 2, wherein the single taper is between about 2 degrees and about 5 degrees.

4. The tubular connection of claim 3, wherein the single taper is between about 2 degrees and about 3 degrees.

5. The tubular connection of claim 1, further comprising a sealing element disposed between the small step and the large step of one of the pin member and the box member, wherein the sealing element provides a seal at the selected make-up.

6. The tubular connection of claim 1, wherein the pin thread and the box thread have a trapped thread form.

7. The tubular connection of claim 1, wherein, upon the selected make-up of the pin member with the box member, an interference exists between at least one of a pin thread crest and a box thread root and a box thread crest and a pin thread root.

8. The tubular connection of claim 1, wherein one of the first seal surface and the second seal surface is frustoconical and the other is curved.

9. The tubular connection of claim 1, wherein one of the first seal surface and the second seal surface comprises two surfaces that intersect to form a sealing line.

10. The tubular connection of claim 1, wherein one of the first seal surface and the second seal surface is cylindrical.

11. The tubular connection of claim 1, wherein the first seal surface and the second seal surface are frustoconical and have different angles relative to a central axis of the connection.

12. A method of designing a tubular connection, the method comprising:
    selecting a pin member and a box member, each having a small step and a large step with wedge threads formed thereon;
    selecting a first seal surface to form between the small step and the large step of the pin member;
    selecting a second seal surface to form between the small step and the large step of the box member, wherein the first seal surface and the second seal surface are configured to form a seal at a selected contact pressure and wherein at least one of the first seal surface and the second seal surface is frustoconical;
    selecting a wedge ratio and an angle for the seal surface that is frustoconical such that galling does not occur between the first seal surface and the second seal surface within a selected torque range.

13. A tubular connection designed using the method of claim 12.

* * * * *